(12) United States Patent
Kamibeppu

(10) Patent No.: US 10,175,878 B2
(45) Date of Patent: Jan. 8, 2019

(54) ELECTRONIC APPARATUS

(75) Inventor: Shinichi Kamibeppu, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 218 days.

(21) Appl. No.: 13/133,341

(22) PCT Filed: Jan. 27, 2011

(86) PCT No.: PCT/JP2011/000456
§ 371 (c)(1),
(2), (4) Date: Jun. 7, 2011

(87) PCT Pub. No.: WO2011/105009
PCT Pub. Date: Sep. 1, 2011

(65) Prior Publication Data
US 2012/0306764 A1 Dec. 6, 2012

(30) Foreign Application Priority Data
Feb. 23, 2010 (JP) .................................. 2010-037594

(51) Int. Cl.
*G06F 3/041* (2006.01)
*G06F 3/0488* (2013.01)
*G06F 3/0486* (2013.01)
*G06F 3/01* (2006.01)

(52) U.S. Cl.
CPC .......... *G06F 3/04883* (2013.01); *G06F 3/016* (2013.01); *G06F 3/0486* (2013.01)

(58) Field of Classification Search
CPC .... G06F 3/04883; G06F 3/016; G06F 3/0486; G06F 2203/04105

USPC .................. 345/104, 156, 173–178; 178/18.01–18.09, 18.11
See application file for complete search history.

(56) References Cited

U.S. PATENT DOCUMENTS

| 5,611,060 | A | * | 3/1997 | Belfiore et al. | ................ 715/819 |
| 5,726,687 | A | * | 3/1998 | Belfiore et al. | ................ 715/785 |
| 6,492,979 | B1 | * | 12/2002 | Kent | ..................... G06F 3/0414 |
| | | | | | 178/18.01 |

(Continued)

FOREIGN PATENT DOCUMENTS

| JP | 01-118474 U | 8/1989 |
| JP | 02-087382 U | 7/1990 |

(Continued)

OTHER PUBLICATIONS

International Search Report; PCT/JP2011/000456; dated Mar. 8, 2011.

(Continued)

*Primary Examiner* — Adam R. Giesy
(74) *Attorney, Agent, or Firm* — Studebaker & Brackett PC

(57) ABSTRACT

Provided is an electronic apparatus for receiving an input in accordance with a pressure load which can reduce the possibility to drop an object being dragged. The electronic apparatus includes a display unit for displaying an object, a touch sensor for detecting a touch to the display unit, a load detection unit for detecting a pressure load on a touch face of the touch sensor, and a control unit for controlling to start drag processing of the object based on detection of the touch to the object by the touch sensor and detection by the load detection unit. The control unit controls the load detection unit to stop detection after the drag processing is started.

6 Claims, 5 Drawing Sheets

(56) References Cited

U.S. PATENT DOCUMENTS

| | | | |
|---|---|---|---|
| 6,545,669 B1* | 4/2003 | Kinawi | G06F 3/0486 345/1.1 |
| 6,590,568 B1 | 7/2003 | Astala et al. | |
| 6,940,494 B2 | 9/2005 | Hoshino et al. | |
| 7,119,797 B2* | 10/2006 | Kawano | G06F 3/041 178/18.01 |
| 7,245,293 B2 | 7/2007 | Hoshino et al. | |
| 2002/0047586 A1 | 4/2002 | Itoh et al. | |
| 2004/0021643 A1 | 2/2004 | Hoshino et al. | |
| 2005/0110769 A1 | 5/2005 | DaCosta et al. | |
| 2005/0259087 A1 | 11/2005 | Hoshino et al. | |
| 2006/0061944 A1 | 3/2006 | Nakatani et al. | |
| 2007/0024595 A1* | 2/2007 | Baker | G06F 3/03547 345/173 |
| 2009/0174679 A1* | 7/2009 | Westerman | G06F 3/03547 345/173 |
| 2010/0270089 A1* | 10/2010 | Kyung | G06F 3/016 178/18.04 |
| 2011/0050608 A1 | 3/2011 | Homma et al. | |

FOREIGN PATENT DOCUMENTS

| | | | |
|---|---|---|---|
| JP | 06-324794 A | | 11/1994 |
| JP | H7-151512 A | | 6/1995 |
| JP | 08-321337 | | 12/1996 |
| JP | 2001-265519 A | | 9/2001 |
| JP | 2002-032056 A | | 1/2002 |
| JP | 2003-015540 A | | 1/2003 |
| JP | 2004-070492 A | | 3/2004 |
| JP | 2004070492 A | * | 3/2004 |
| JP | 2004-347622 A | | 12/2004 |
| JP | 2005-017628 A | | 1/2005 |
| JP | 2006-003810 A | | 1/2006 |
| JP | 2006-039745 A | | 2/2006 |
| JP | 2006-065119 A | | 3/2006 |
| JP | 2006-311224 A | | 11/2006 |
| JP | 2007-080110 A | | 3/2007 |
| JP | 2007080110 A | * | 3/2007 |
| JP | 2007-225987 A | | 9/2007 |
| JP | 2011-53972 A | | 3/2011 |
| KR | 10-2010-0018883 A | | 2/2010 |
| WO | 2008/010288 A1 | | 1/2008 |

OTHER PUBLICATIONS

International Search Report; PCT/JP2009/000456; dated Mar. 10, 2009.

Japanese Office Action "Notification of Reasons for Refusal" dated Jan. 29, 2013, which corresponds to JP Patent Application No. 2011-274931 and is related to U.S. Appl. No. 13/133,341 with translation.

An Office Action; "Decision of Refusal," issued by the Japanese Patent Office dated Jul. 30, 2013, which corresponds to Japanese Patent Application No. 2011-274931 and is related to U.S. Appl. No. 13/133,341; with Concise Explanation.

An Office Action; "Notification of the First Office Action," issued by the State Intellectual Property Office of China dated Mar. 24, 2015, which corresponds to Chinese Patent Application No. 201180020300.0 and is related to U.S. Appl. No. 13/133,341; with English language translation.

An Office Action issued by the Korean Patent Office dated May 19, 2014, which corresponds to Korean Patent Application No. 10-2012-7024599 and is related to U.S. Appl. No. 13/133,341; with English language statement of relevance.

The extended European search report issued by the European Patent Office dated Apr. 28, 2016, which corresponds to European Patent Application No. 11746982.5-1507 and is related to U.S. Appl. No. 13/133,341.

An Office Action issued by the Korean Patent Office dated Nov. 26, 2013, which corresponds to Korean Patent Application No. 10-2012-7024599 and is related to U.S. Appl. No. 13/133,341; with English language statement of relevance.

* cited by examiner

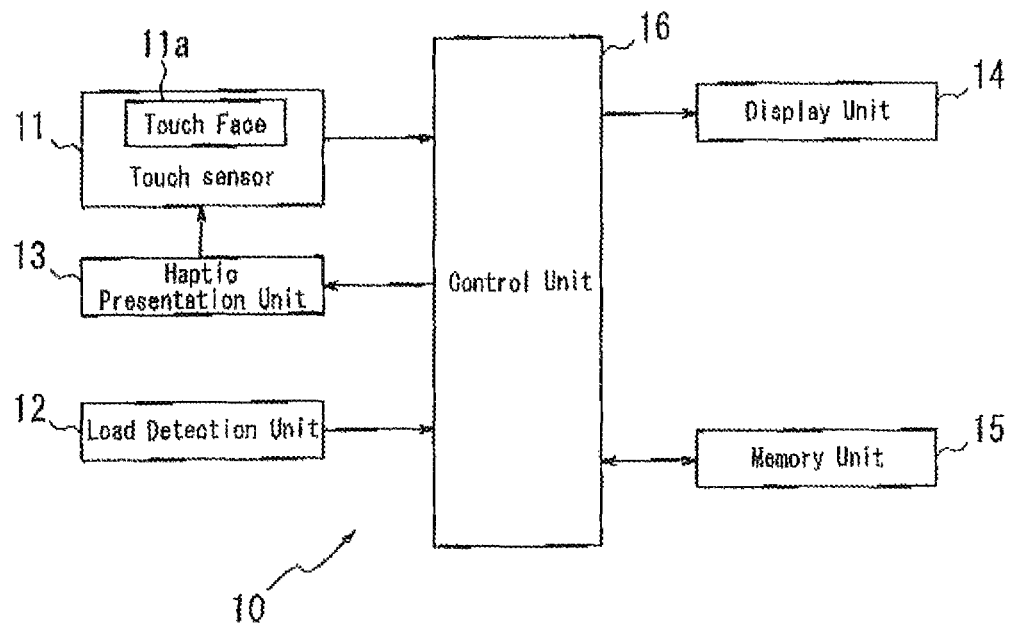
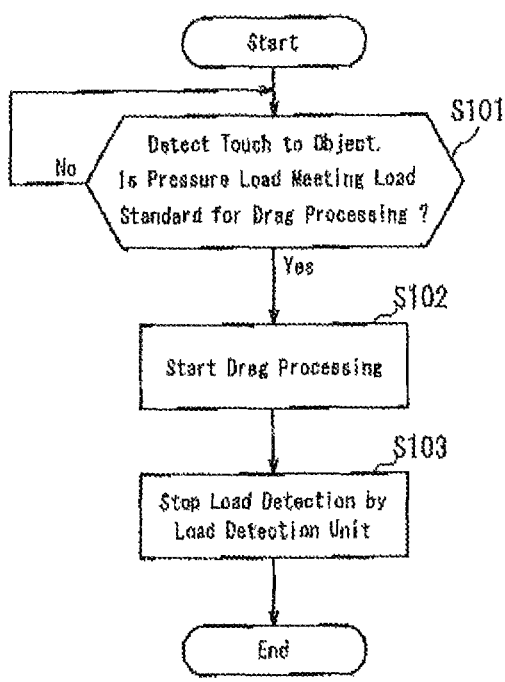

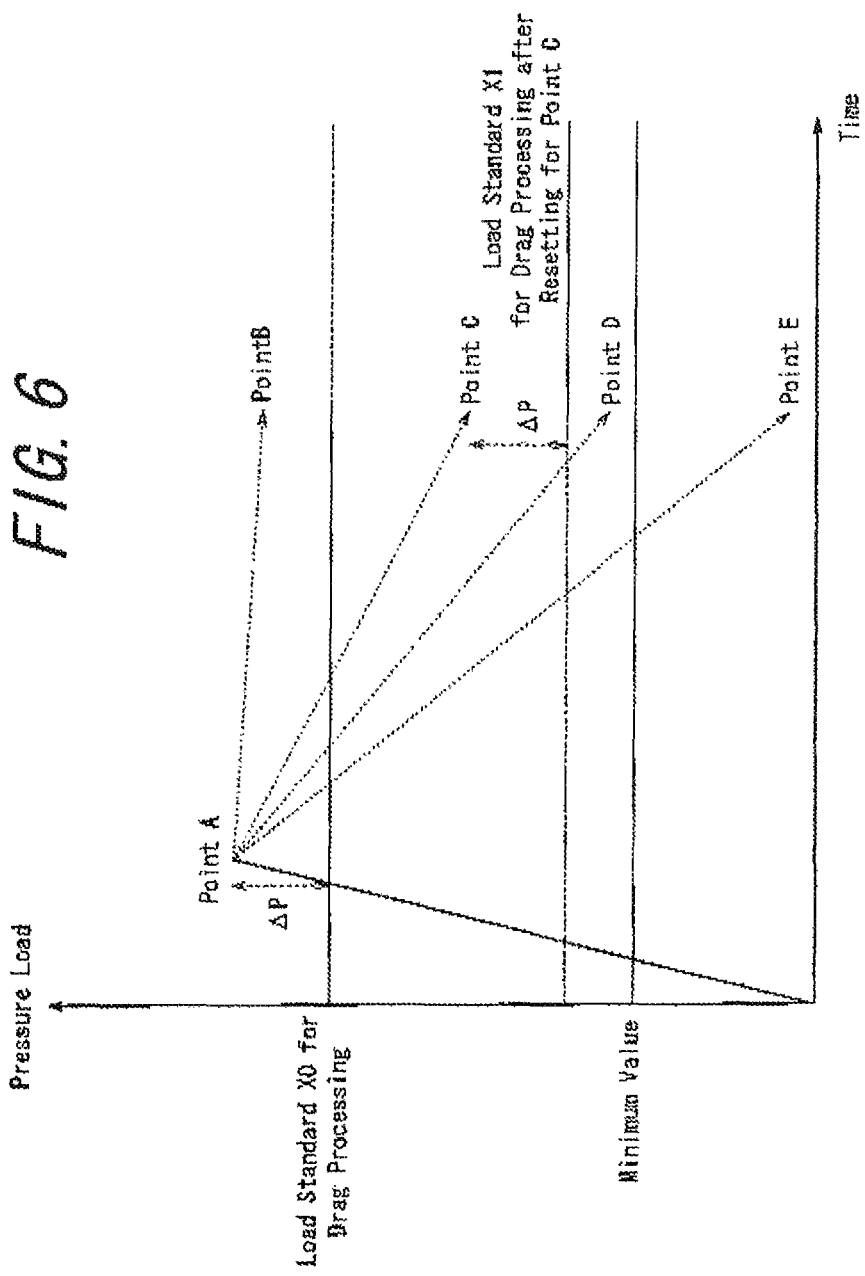

ELECTRONIC APPARATUS

CROSS REFERENCE TO RELATED APPLICATION

This application claims priority to and the benefit of Japanese Patent Application No. 2010-037594 (filed on Feb. 23, 2010), the entire contents of which are incorporated herein by reference.

TECHNICAL FIELD

The present invention relates to electronic apparatuses, and more particularly, to electronic apparatuses which performs drag processing for objects.

BACKGROUND ART

For mobile terminals such as mobile phones, for example, input apparatuses used by a user to operate the terminals have been developed in various manners according to functions and usages of the terminals. In many cases, the input apparatuses are configured to allow a user to perform an input operation by directly pressing down mechanical keys or buttons prearranged on a surface of a body of the mobile terminal.

The mechanical keys (numerical keypads, for example) of the input apparatuses of the mobile terminals are typically prearranged according to a main usage of the terminals. In general, the physical arrangement of keys defined first cannot be rearranged afterward.

Incidentally, there recently are small mobile terminals with a variety of functions incorporated therein, such as the mobile phones having functions of a digital camera and of a music player installed therein. There are mobile terminals, such as the mobile phones, having numerous supplementary functions incorporated therein in addition to a function for a main usage, and PDAs (Personal Digital Assistant: mobile information terminal) having a plurality of main usages within respective terminals, such as schedule management, an address book and the like. For such terminals, the fixed arrangement of keys may cause inconvenience significantly in input operation using certain functions.

In order to resolve such inconvenience, there is disclosed an input apparatus having a touch panel in which a transparent input unit is arranged on a front face of a liquid crystal display panel, which is a display unit (for example, see Patent Document 1). The input apparatus having such a touch panel is generally configured to display graphical images of operation keys or buttons (hereinafter, referred to as "objects") on a display screen of the touch panel. When the user presses an object displayed on the display screen, the input unit of the touch panel at a corresponding position receives an input.

Since the input apparatus having such a touch panel receives an input in the form of a user's direct contact (touch) to the object displayed on the display unit with a user's fingertip or the like, it allows the user to operate highly intuitively. That is, the user operates the input apparatus by directly touching the object displayed on the screen with the fingertip or the like following a guide displayed on the screen of the touch panel. Therefore, it allows the user to operate the terminal extremely easily by an intuitive operation following the guide displayed on the screen and, as a result, offers an effect to reduce incorrect operations.

As stated above, since the touch panels have advantages that allow for a freer configuration of the input units and enable highly intuitive input operations, the terminal apparatuses having the input units with the touch panels have been on the increase.

In order to further improve operability of such a touch panel, there is suggested an input apparatus provided with a pressure detection means for detecting an operation pressure on the touch panel and capable of receiving an input in accordance with pressure load of the input by a user (for example, see Patent Document 2). Accordingly, this input apparatus can be controlled not to receive an input unless the pressure applied to the touch panel is equal to or higher than a predetermined pressure. Therefore, this input apparatus can prevent erroneous operations, such as a reception of a mere contact to the touch panel.

DOCUMENTS OF PRIOR ARTS

Patent Documents

Patent Document 1: Japanese Patent Laid-Open No. 2006-311224

Patent Document 2: Japanese Patent Laid-Open No. 2006-039745

SUMMARY OF INVENTION

Technical Problem

Here, it is assumed that such an input apparatus for receiving an input based on the pressure to the touch panel applied by the user performs the drag processing of an object displayed on the display unit as follows. First, for this input apparatus, a load standard (referred to as an "input reception load standard") for receiving an input and another load standard (referred to as an "input cancellation load standard") for canceling the input are defined. The input apparatus receives an input if the load detection unit detects a pressure load meeting (exceeding) the input reception load standard, and after reception of the input, it cancels the input if the load detection unit detects a pressure load failing to meet ("under" or "equal to") the input reception load standard.

Next, in the drag processing, when a finger or a stylus carrying out an input operation slides on the touch panel in a state that the pressure load of the input operation (touch) applied, to the object displayed on the display unit meets the input reception load standard, the drag processing is started in response to such sliding and the object is displayed at a position corresponding to a position of the finger or the like sliding on the display unit. Then, when the pressure load of the input operation (touch) applied to the object fails to meet the input cancellation load standard, the object being dragged is dropped (when the load detection unit detects the load failing to meet the input cancellation load standard, the object is displayed at a position on the display unit corresponding to the position of the touch panel touched by a touch object such as the finger or the like), then the drag processing ends.

Since in the drag processing as above the input apparatus for receiving the input based on the pressure on the touch panel applied by the user determines a start and an end of the drag based on a pressure load detected by the load detection unit, there is the possibility to drop the object being dragged at a position unintended by the user. For example, in order to start dragging, the user needs to slide the finger or the like applying pressure to the object. While the pressure is applied to the object in a vertical direction before sliding, it is necessary to apply the pressure in a horizontal direction as well as in the vertical direction in order to slide the finger or the like. Accordingly, even if the same pressure (scalar quantity) is applied to the input apparatus by the user before and after the start of sliding, a vector of the pressure applied to the input apparatus after the start of sliding is different from that before sliding, as a result. The pressure in the vertical direction is therefore reduced after start of sliding because of an increase in the pressure in the horizontal direction. When the pressure in the vertical direction is reduced like this, the pressure load detected by the load detection unit fails to meet the input cancellation load standard, which may cause unintended drop of the object.

In addition, the object may also be dropped at an unintended position if, during sliding; the pressure in the horizontal direction is increased for the purpose of increasing a sliding speed, unintentionally reducing the pressure in the vertical direction.

Accordingly, an object of the present invention in consideration of such conditions is to provide an electronic apparatus for receiving an input in accordance with a pressure load capable of reducing the possibility to drop an object in the drag processing against a user's intention.

Solution to Problem

In order to solve the above problems, an electronic apparatus according to a first invention includes; a display unit for displaying an object; a touch sensor for detecting a touch to the display unit; a load detection unit for detecting a pressure load on a touch face of the touch sensor; and a control unit for controlling to start drag processing of the object based on detection of the touch to the object by the touch sensor and detection by the load detection unit, wherein the control unit controls the load detection unit to stop detection after the drag processing is started.

The electronic apparatus according to a second invention is characterized in that the control unit controls to start the drag processing of the object if a pressure load meeting a predetermined load standard is detected by the load detection unit and sliding originated from a position of the touch to the object is detected.

The electronic apparatus according to a third invention is characterized in that the control unit controls the load detection unit to resume detection if the sliding is no longer detected after the start of the drag processing of the object, and if a pressure load detected by the load detection unit at time of resuming fails to meet the predetermined load standard, sets the predetermined load standard to a load standard lower than the pressure load detected.

The electronic apparatus according to a fourth invention is characterized in that the control unit sets the load standard lower than the pressure load detected to a load standard which is lower than the pressure load detected by a difference between the pressure load detected by the load detection unit at the start of the drag processing and the predetermined load standard, as the predetermined load standard.

The electronic apparatus according to a fifth invention is characterized in that the control unit controls to end the drag processing based on detection by the touch sensor after the start of the drag processing.

An electronic apparatus according to a sixth invention includes: a display unit for displaying an object; a touch sensor for detecting a touch to the display unit; a load detection unit for detecting a pressure load on a touch face of the touch sensor; a haptic presentation unit for presenting a haptic sense to a touch object touching the touch face; and a control unit for controlling to start drag processing of the object based on detection of the touch to the object by the touch sensor and detection by the load detection unit, wherein the control unit controls such that the load detection unit stops detection from the start of the drag processing until a sliding speed of the touch object for the drag processing of the object no longer meets a predetermined speed standard and that, after the sliding speed of the touch object for the drag processing of the object fails to meet the predetermined speed standard, the haptic sense is presented to the touch object when the load detection unit detects a load standard failing to meet a load standard for presenting the haptic sense and the drag processing is ended.

Effect of the Invention

According to the electronic apparatus of the present invention, since the load detection unit stops detecting a load after drag processing is started, it can reduce the possibility to drop an object in the drag processing at a position unintended by a user due to a change in the pressure load detected by the load detection unit.

BRIEF DESCRIPTION OF DRAWINGS

FIG. 1 is a functional block diagram of an electronic apparatus according to an embodiment of the present invention;

FIG. 2 is a flowchart illustrating drag processing by an electronic apparatus according to a first embodiment;

FIG. 6 is a diagram illustrating an example of resetting a load standard for the drag processing.

DESCRIPTION OF EMBODIMENTS

Figure 3:
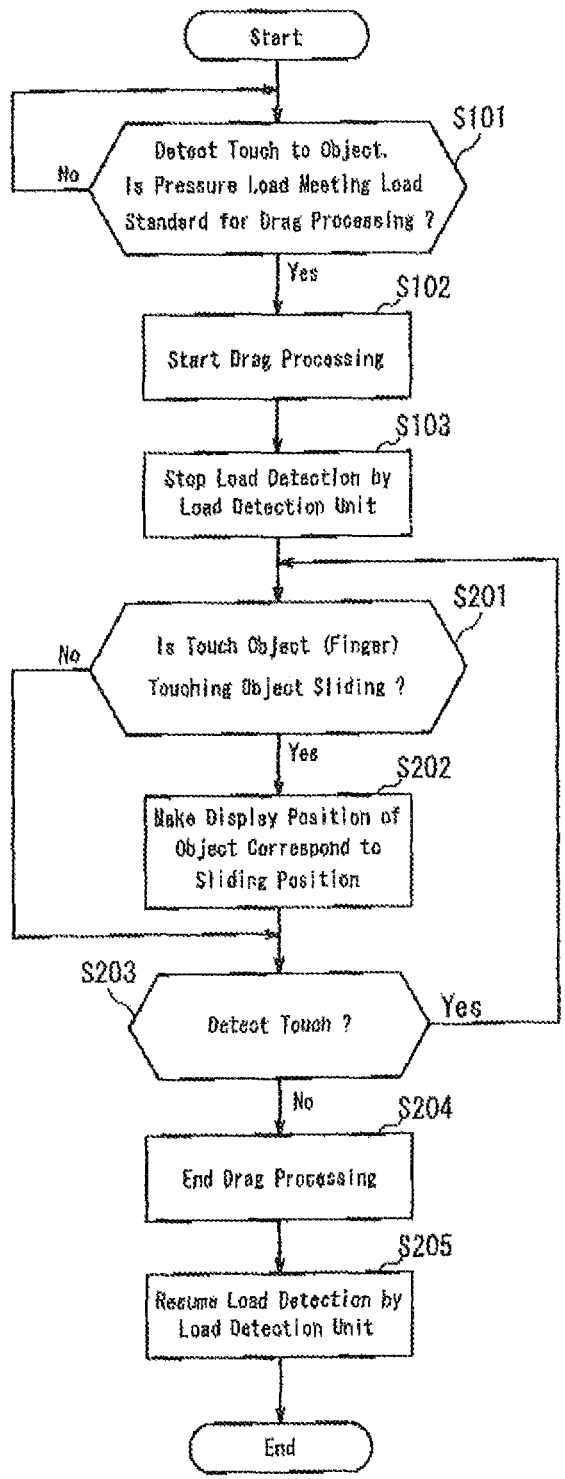
FIG. 3 is a flowchart illustrating drag processing by an electronic apparatus according to a second embodiment.

Embodiments of an electronic apparatus according to the present invention will be described with reference to the accompanying drawings.

First Embodiment

FIG. 1 is a functional block diagram of an electronic apparatus 10 according to the embodiment of the present invention. As shown in FIG. 1, the electronic apparatus 10 has a touch sensor 11, a load detection unit 12, a haptic presentation unit 13, a display unit 14, a memory unit 15 and a control unit 16 for controlling overall operations.

The touch sensor 11 detects a touch by a touch object such as a finger or a stylus to a touch face 11a thereof. The touch sensor 11 may be of resistive type, capacitance type, or optical type and is arranged on the display unit 14. The load detection unit 12 detects a pressure load of a pressure input, and for example, detects a pressure load on the touch face 11a of the touch sensor 11. The load detection unit 12 may include an element reactive to a load such as, for example, a strain gauge sensor or a piezoelectric element. The haptic presentation unit 13 vibrates the touch sensor 11 and may include, for example, a piezoelectric element.

The display unit 14 displays input objects, and may include, for example, a liquid crystal display panel, an organic EL display panel or the like. A touch by the touch object to an object such as an operation key or button for input (hereinafter, referred to simply as an "object") displayed on the display unit 14 is detected by the control unit 16 based on position information output by the touch sensor 11. When a touch is performed to the input object, processing or an application corresponding to the input object is activated.

The memory unit 15 stores various applications and input information, and functions as a work memory. The memory unit 15 temporarily stores a pressure load on the touch face 11a detected by the load detection unit 12, for processing by the control unit 16.

The control unit 16 may be CPU, for example, and performs drag processing based on the position information from the touch sensor 11 and the pressure load information from the load detection unit 12.

Next, the drag processing by the electronic apparatus 10 according to the present embodiment will be described, FIG. 2 is a flowchart illustrating a flow of the drag processing by the electronic apparatus 10 according to the present embodiment.

First, the control unit 16 detects a touch to an object displayed on the display unit 14 by the touch sensor 11 and determines whether a pressure load detected by the load detection unit 12 meets a load standard for the drag processing (referred to as a "drag processing load standard") (step S101). If it detects the touch to the object by the touch sensor 11 and also determines that the pressure load detected by the load detection unit 12 meets the drag processing load standard, the control unit 16 starts the drag processing for this object (step S102). After step S102, the control unit 16 controls the load detection, unit 12 to stop load detection (step S103). Meanwhile, if the control unit 16 detects the touch to the object displayed on the display unit 14 by the touch sensor 11 and also determines that the pressure load detected by the load detection unit 12 fails to meet the drag processing load standard at step S101, the control unit 16 performs the processing at step S101 once again after a predetermined period.

If the touch object such as a finger or the like touching the touch face 11a slides on the touch face 11a after the start of the drag processing, the object displayed is moved to a position on the display unit 14 corresponding to such sliding on the touch face 11a.

There are expressions of meeting the (drag processing) load standard in the above description. The pressure load may be determined as "meeting the load standard" if the pressure load reaches a value of the standard load assumed as a "threshold of a pressure load", for example. However, the condition to determine "meeting the load standard" is not limited thereto but it may be determined as "meeting the load standard" if the pressure load detected by the load detection unit 12 exceeds the value of the load standard.

In addition, there are expressions of failing to meet the (drag processing) load standard in the above description. The pressure load is determined as "failing to meet the load standard" if the pressure load is equal to or lower than the value of the load standard assumed as the "threshold of a pressure load", for example. However, the condition to determine "failing to meet the load standard" is not limited thereto but it may be determined as "failing to meet the load standard" if the pressure load detected by the load detection unit 12 is below the load standard.

According to the present embodiment, as described above, since the load detection unit 12 stops detecting the pressure load once the drag processing has been starred, it can reduce the possibility to drop the object in the drag processing at a position unintended by a user during the drag processing due to a change in the pressure load detected by the load detection unit 12.

Second Embodiment

Next, the electronic apparatus 10 according to a second embodiment of the present invention will be described. The electronic apparatus 10 according to the second embodiment may have the same configuration as that of the first embodiment but with different processing and operations by the control unit 16. Accordingly, the same explanation and description of the same effects as those of the first embodiment are appropriately omitted.

Input processing according to the second embodiment will be described with reference to a flowchart in FIG. 3. Steps for the same processing as those in FIG. 2 are given the same step numbers.

The control unit 16, after step S103, determines whether the touch object such as the finger touching an object is sliding on the touch face 11a of the touch sensor 11 (step S201). If it determines that the touch object such as the finger is sliding on the touch face 11a of the touch sensor 11, the control unit 16 controls such that the object displayed on the display unit 14 moves to a position on the display unit 14 corresponding to a position where the touch object such as the finger is sliding (touching) on the touch face 11a of the touch sensor 11 (step S202).

If it determines that the touch object such as the finger is not sliding on the touch face 11a of the touch sensor 11 after step S202 or at step S201, the control unit 16 determines whether the touch object such as the finger is touching the touch face 11a of the touch sensor 11 (step S203). If it determines that the touch object such as the finger is not touching the touch face 11a of the touch sensor 11, the control unit 16 ends the drag processing (step S204) and resumes the load detection by the load detection unit 12 (step S205). In contrast, if the control unit 16 determines that the touch object is touching the touch face 11a of the touch sensor 11, the processing returns to step S201.

According to the present embodiment, as described above, since the load detection unit 12 stops detecting a pressure load once the drag processing has been started until the drag processing ends, it can reduce the possibility to drop the object in the drag processing at a position unintended by the user during the drag processing due to a change in the pressure load detected by the load detection unit 12.

Third Embodiment

Now, an electronic apparatus 10 according to a third embodiment of the present invention will be described. The electronic apparatus 10 according to the third embodiment may have the same configuration as that of the first embodiment but with different processing and operations by the control unit 16. Accordingly, the same explanation and description of the same effect as those of the first embodiment are appropriately omitted.

Figure 4:
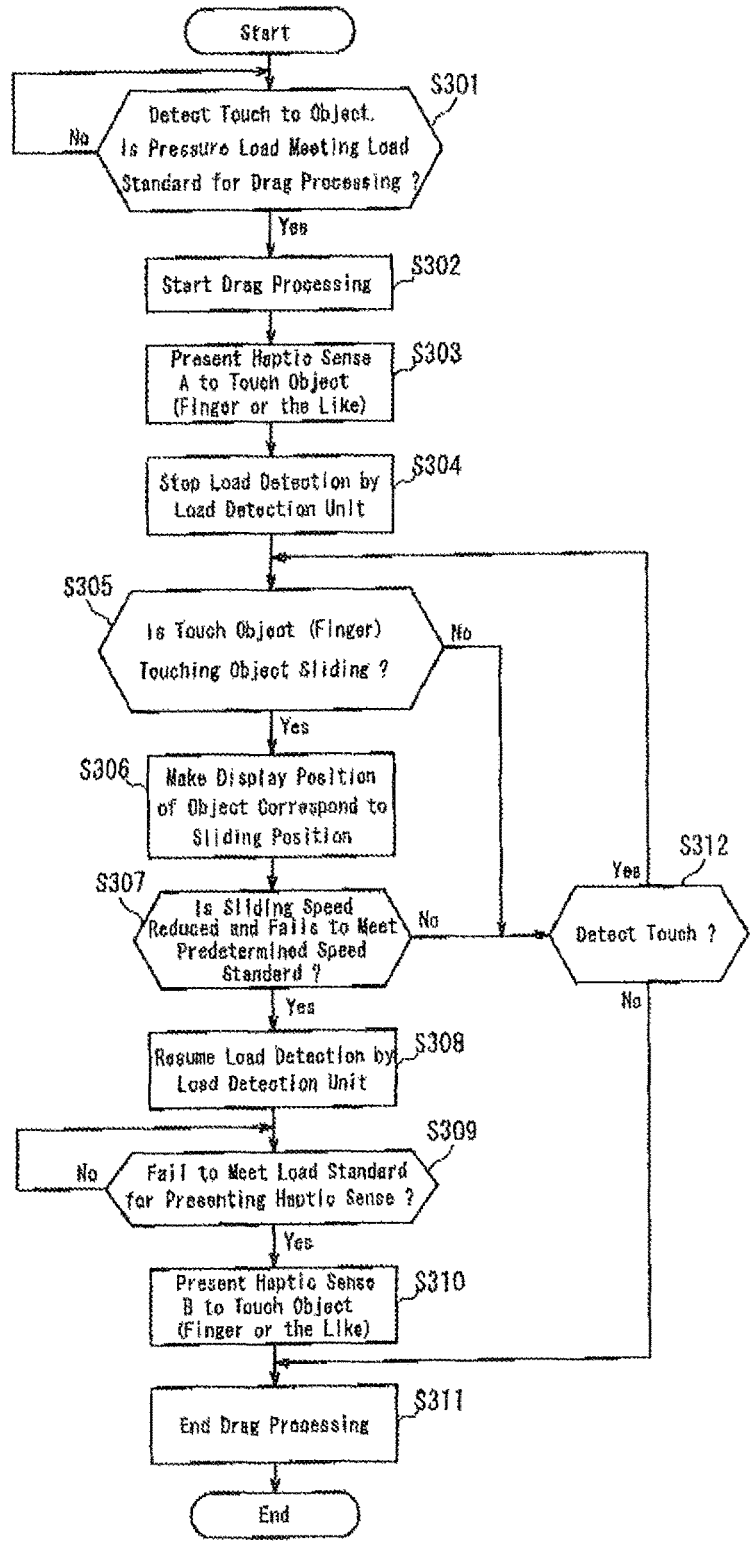
FIG. 4 is a flowchart illustrating drag processing by an electronic apparatus according to a third embodiment.

Input processing according to the third embodiment will be described with reference to a flowchart in FIG. 4. According to the third embodiment, the control unit 16 first detects a touch to an object displayed on the display unit 14 by the touch sensor 11 and also determines whether a pressure load detected by the load detection unit 12 meets the load standard for the drag processing (referred to as a "drag processing load standard") (step S301). If it detects a touch to the object by the touch sensor 11 and also determines that the pressure load detected by the load detection unit 12 meets the drag processing load standard, the control unit 16 starts the drag processing for the object (step S302). After step S302, in order to inform the user that the drag processing has been started, the control unit 16 controls the haptic presentation unit 13 to present haptic sense A to the touch object such as the finger touching the touch face 11a (step S303). Then, the control unit 16 controls the load detection unit 12 to stop load detection (step S304). Next, the control unit 16 determines whether the touch object such as the finger touching the object is sliding on the touch face 11a of the touch sensor 11 (step S305). If it determines that the touch object such as the finger is sliding on the touch face 11a of the touch sensor 11, the control unit 16 controls such that the object displayed on the display unit 14 moves to a position on the display unit 14 corresponding to a position where the touch object such as the finger is sliding (touching) on the touch face 11a is of the touch sensor 11 (step S306).

After step S306, the control unit 16 detects a speed of the touch object such as the finger sliding on the touch face 11a of the touch sensor 11 and determines whether the sliding speed is being reduced and fails to meet a predetermined speed standard (step S307). If it determines that the sliding speed of the touch object such as the finger is being reduced and fails to meet the predetermined speed standard, the control unit 16 resumes the load detection by the load detection unit 12 (step S308). After step S308, the control unit 16 determines whether the pressure load detected by the load detection unit 12 meets a load standard for presenting the haptic sense (step S309). If it determines that the pressure load detected by the load detection unit 12 fails to meet the load standard for presenting the haptic sense, the control unit 16 controls the haptic presentation unit 13 to present haptic sense B to the touch object such as the finger touching the touch face 11a (step S310). It is to be noted that the haptic sense B may be either the same as or different from the haptic sense A at step S303. After step S310, the control unit 16 ends the drag processing (step S311) and then ends the processing.

In contrast, the processing shifts to step S312 if the control unit 16 determines that the touch object such as the finger touching the object is not sliding on the touch face 11a of the touch sensor 11 at step S305, or if the control unit 16 detects the speed of the touch object such as the finger sliding on the touch face 11a of the touch sensor 11 and determines that the sliding speed is not being reduced or meeting the predetermined speed standard at step S307. At step S312, the control unit 16 determines whether the touch object such as the finger is touching the touch face 11a of the touch sensor 11. While the control unit 16 returns to step S305 if it determines that the touch object such as the finger is touching the touch face 11a a of the touch sensor 11, the control unit 16 shifts to step S311 if it determines that the touch object is not touching the touch face 11a of the touch sensor 11. When the control unit 16 ends the drag processing at step S311 after passing the step S312, the load detection unit 12 is still stopping load detection. Therefore, after end of the drag processing the control unit 16 controls the load detection unit 12 to resume load detection.

In the above description, there are expressions of failing to meet the (predetermined) speed standard. The sliding speed may be determined as "failing to meet the speed standard" if the sliding speed is slower than a value of the speed standard assumed as a "threshold of a sliding speed", for example. However, the condition to determine "failing to meet the speed standard" is not limited thereto, but the control unit 16 may determine "failing to meet the speed standard" if the speed of the finger or the like sliding on the touch face 11a is equal to or slower than the speed standard.

In addition, there are expressions of meeting the (predetermined) speed standard in the above description. The sliding speed may be determined as "meeting the speed standard" if the sliding speed exceeds the value of the speed standard, assumed as the "threshold of the sliding speed", for example.

According to the present embodiment, as described above, the load detection unit 12 resumes load detection if, after the start of the drag processing, the sliding speed is reduced and fails to meet the predetermined speed standard, and the haptic sense is presented to the touch object such as the finger if the pressure load detected by the load detection unit 12 fails to meet the load standard for presenting the haptic sense. Controlling in this manner enables a user to know a timing of dropping from the haptic sense.

Fourth Embodiment

Next, the electronic apparatus 10 will be described in accordance with a fourth embodiment of the present invention. The electronic apparatus 10 according to the fourth embodiment may have the same configuration as that of the first embodiment but with different processing and operations by the control unit 16. Accordingly, the same explanation and description of the same effects as those of the first embodiment are appropriately omitted.

Figure 5:
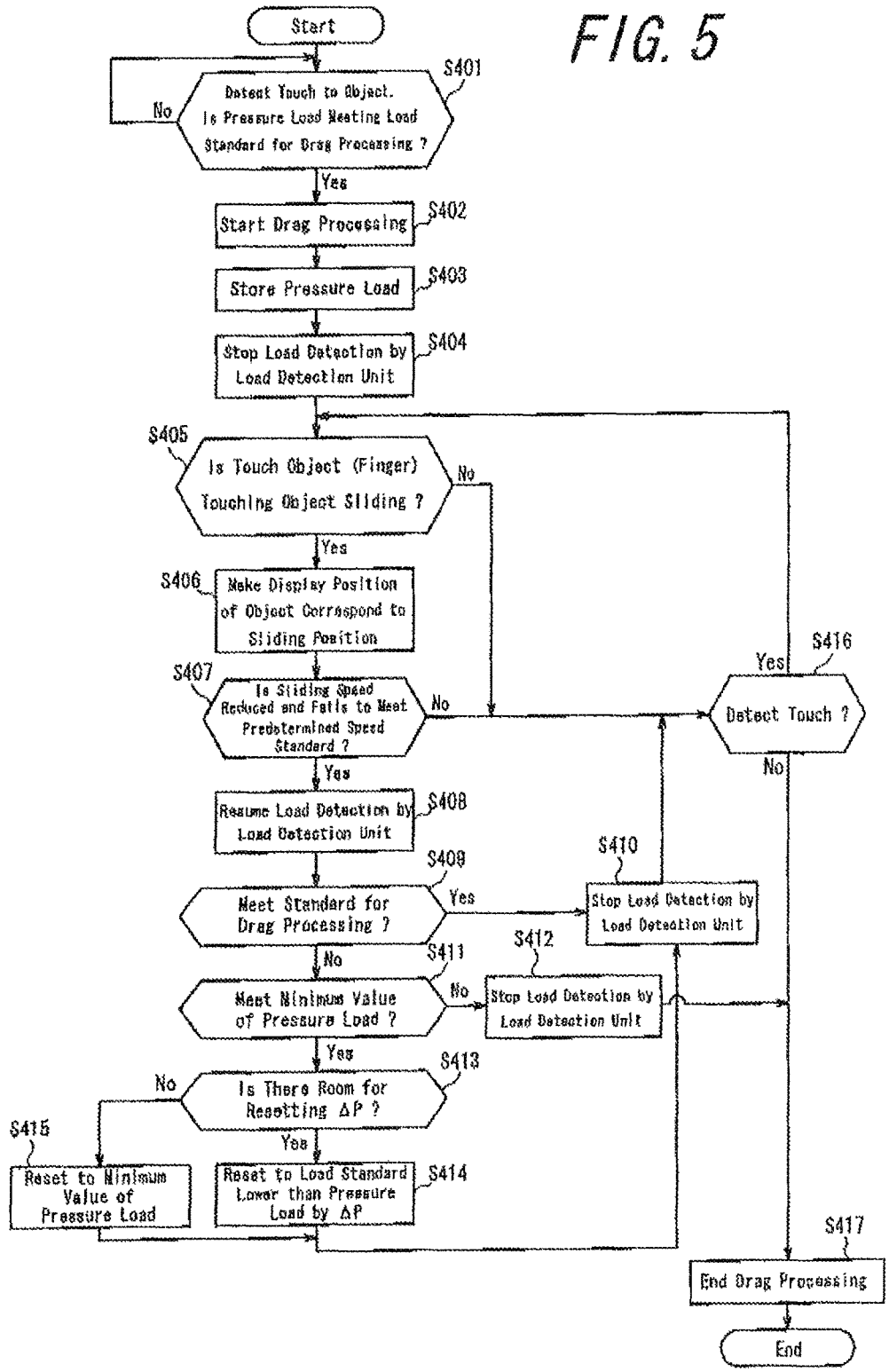
FIG. 5 is a flowchart illustrating drag processing by an electronic apparatus according to a fourth embodiment.

Input processing according to the fourth embodiment is described with reference to a flowchart in FIG. 5 and examples of changes in the pressure load in FIG. 6. According to the fourth embodiment, the control unit 16 first detects a touch to an object displayed on the display unit 14 by using the touch sensor 11 and determines whether the pressure load detected by the load detection unit 12 meets the load standard for the drag processing (drag processing load standard) (step S401). If it detects a touch to the object by using the touch sensor 11 and determines that the pressure load detected by the load detection unit 12 meets the drag processing load standard as shown by a point A in FIG. 6, the control unit 16 starts the drag processing of the object (step S402). Subsequently, the control unit 16 carries out processing to store the pressure load at the start of the drag processing (step S403). For example, the control unit 16 stores a difference (ΔP) between the pressure load (point A) detected by the load detection unit 12 at the start of the drag processing and the drag processing load standard (X0) in the memory unit 15. After step S403, the control unit 16 controls the load detection unit 12 to stop load detection (step S404). Next, the control unit 16 determines whether the touch object such as the finger touching the object is sliding on the touch face 11a of the touch sensor 11 (step S405). If it determines that the touch object such as the finger is sliding on the touch face 11a of the touch sensor 11, the control unit 16 controls such that the object displayed on the display unit 14 moves to a position on the display unit 14 corresponding to a position where the touch object is sliding (touching) on the touch face 11a of the touch sensor 11 (step S406).

After step S406, the control unit 16 detects the speed of the touch object such as the finger sliding on the touch face 11a of the touch sensor 11 and also determines whether the sliding speed is being reduced and fails to meet the predetermined speed standard (step S407). If it determines that the sliding speed of the touch object such as the finger is being reduced and fails to meet the predetermined speed standard, the control unit 16 controls the load detection unit 12 to resume load detection (step S408). After step S408, the control unit 16 determines whether the pressure load detected by the load detection unit 12 meets the drag processing load standard (step S409). If it determines that the pressure load detected by the load detection unit 12 meets the drag processing load standard as shown by a point B in FIG. 6, for example, the control unit 16 controls the load detection unit 12 to stop load detection (step S410) and the processing shifts to step S416. That is, the control unit 16 determines that the drag processing is ongoing.

If it determines that the pressure load detected by the load detection unit 12 fails to meet the drag processing load standard, the control unit 16 determines whether this pressure load meets a minimum value of the pressure load (step S411). If the pressure load detected by the load detection unit 12 fails to meet the minimum value of the pressure load as shown by a point E in FIG. 6, the control unit 16 determines that the drag operation by the user is ended. The control unit 16 controls the load detection unit 12 to stop load detection (step S412) and drops the object being dragged to end the drag processing (step S417).

In contrast, if it determines that the pressure load detected by the load detection unit 12 meets the minimum value of the pressure load as shown by points C, D in FIG. 6, for example, the control unit 16 resets the drag processing load standard to a load standard lower than the pressure load detected by the load detection unit 12. First, the control unit 16 determines whether between the pressure load detected by the load detection unit 12 and the minimum value of the pressure load there is room for reset equal to or more than the predetermined difference ($\Delta P$) (step S413). If there is room equal to or more than a between the pressure load detected by the load detection unit 12 and the minimum value of the pressure load as shown by the point C in FIG. 6, for example, the control unit 16 resets the drag processing load standard to a load standard (X1) lower than the pressure load detected by the load detection unit 12 by $\Delta P$ (step S414). In contrast, if there is no room equal to or more than a between the pressure load detected by the load detection unit 12 and the minimum value of the pressure load as shown by the point D in FIG. 6, for example, the control unit 16 sets the drag processing load standard to the minimum value of the pressure load (step S415). That is, even if the pressure load detected fails to meet the drag processing load standard after the load detection unit 12 resumes load detection, the control unit 16 may continue the drag processing by resetting the drag processing load standard. After resetting the drag processing load standard at step S414 or step S415, the control unit 16 controls the load detection unit to stop load detection (step S410) and the processing shifts to step S416.

The processing shifts to step S416 when the control unit 16 determines that the touch object such as the finger touching the object is not sliding on the touch face 11*a* of the touch sensor 11 at step S405, when the control unit 16 detects the speed of the touch object such as the finger sliding on the touch face 11*a* of the touch sensor 11 and determines that the sliding speed is not being reduced or meeting the predetermined speed standard at step S407, or after step S410. At step S416, the control unit 16 determines whether the touch object such as the finger is touching the touch face 11*a* of the touch sensor 11. While the processing returns to step S405 if the control unit 16 determines that the touch object such as the finger is touching the touch face 11*a* of the touch sensor 11, the processing shifts to step S417 if the control unit 16 determines that the touch object such as the finger is not touching the touch face 11*a* of the touch sensor 11. When the control unit 16 ends the drag processing at step S417, the load detection unit 12 is still stopping load detection. Therefore, after end of the drag processing the control unit 16 controls the load detection unit 12 to resume load detection.

According to the present invention, as described above, the control unit 16 controls the load detection unit 12 to resume load detection if sliding is no longer detected after the start of the drag processing. If the pressure load detected by the load detection unit 12 at the time of resuming does not meet the drag processing load standard, the control unit 16 sets the drag processing load standard to a load standard lower than the pressure load detected. Thereby, even if the user momentarily slows down a speed of dragging, the drag processing is maintained ongoing, which can reduce the possibility to drop the object at a position unintended by the user.

According to the present embodiment, in addition, the control unit 16 resets the drag processing load standard, as the drag processing load standard lower than the pressure load detected, to a load standard which is lower than the pressure load detected by the difference ($\Delta P$) between the pressure load detected at the start of the drag processing and the drag processing load standard. Since the difference between the current pressure load and the drag processing load standard which is reset (that is, a value to end the drag processing) is set to the same value as that at the start of the drag processing, the user can intuitively recognize how to adjust the pressure load in order to maintain or cancel the drag processing. Thus, it can reduce the possibility to drop the object at a position unintended by the user.

Although the present invention is described based on figures and the embodiments, a number of variations and modifications will be readily apparent to those skilled in the art based on disclosure of the present invention. Accordingly, it should be noted that such variations and modifications are included within the scope of the present invention.

According to the present embodiment, if the touch sensor 11 detects a touch to the object and also it is determined that the pressure load detected by the load detection unit 12 meets the drag processing load standard, an input is received and the drag processing of the object is started. However, the present invention is not limited thereto but the drag processing may start, for example, if the load detection unit continuously detects a pressure load meeting the predetermined load standard for a predetermined period or more, if the load detection unit continuously detects pressure loads meeting a predetermined load standard plurality of times within a predetermined period, or if the pressure load meets the highest load standard among a plurality of load standards.

According to the present invention, in addition, the control unit 16 controls the haptic presentation unit 13 to present the haptic sense to the touch object touching the touch face 11*a* at the start of the drag processing or at the end thereof. However, a timing to present the haptic sense is not limited thereto but the control unit 16 may control the haptic presentation unit 13 to present the haptic sense to the touch object touching the touch face 11*a*, during the drag processing or while the touch object such as the finger touching the touch face 11*a* is sliding after the start of the drag processing, for example.

According to the third embodiment, if the load detection unit 12 detects a pressure load failing to meet the load standard for presenting the haptic sense, the control unit 16 controls the haptic presentation unit 13 to present the haptic sense to the touch object such as the finger touching the touch face 11a. However, the load standard for presenting the haptic sense may be set based on a pressure load detected when the load detection unit 12 resumes load detection. For example, a standard lower than the pressure load detected by the load detection unit 12 at resuming load detection, may be used as the load standard for presenting the haptic sense. Setting in this manner allows the user to obtain the haptic sense unfailingly when intentionally reduces the pressure after moving the object.

It is also possible that in the third embodiment, between steps S308 and S311 if the control unit 16 detects that the touch object such as the finger touching the touch face 11a is sliding at a speed meeting the predetermined speed standard (which may be either the same as or different from the predetermined speed standard at step S307), the processing returns to step S306 to move the object to a position on the display unit 14 corresponding to a position where the touch object is sliding (touching). The predetermined speed standard at step S307 may also be 0 (stop).

According to the present embodiment, moreover; the control unit 16 starts the drag processing if it detects a touch to an object by the touch sensor 11 and also determines that the pressure load detected by the load detection unit 12 meets the drag processing load standard. However, the present invention is not limited thereto but the control unit 16 may start the drag processing, for example, if it detects a touch to an object by the touch sensor 11, and determines that the pressure load detected by the load detection unit 12 meets the drag processing load standard, and further detects sliding of the touch object such as the finger touching the touch face 11a.

Furthermore, a maximum value may be provided for the difference ($\Delta P$) between a pressure load detected at the start of the drag processing and the drag processing load standard in the fourth embodiment. For example, if the pressure load applied by the user at the start of the drag processing is so heavy that the $\Delta P$ exceeds the maximum value, the control unit 16 may use the maximum value in place of $\Delta P$ at the time of resetting of the drag processing load standard.

REFERENCE SIGNS LIST 11 touch sensor
11a touch face
12 load detection unit
13 haptic presentation unit
14 display unit
15 memory unit
16 control unit

The invention claimed is:

1. An electronic apparatus comprising:
a display unit for displaying an object;
a touch sensor for detecting a touch to the display unit;
a load detection unit for detecting a pressure load on a touch face of the touch sensor; and
a control unit for controlling to start drag processing of the object based on detection of the touch to the object by the touch sensor and detection by the load detection unit,
wherein the control unit controls the load detection unit, regardless of the position of the touch on the touch face, to stop detection until the touch sensor determines that the touch to the object is not detected, after the drag processing is started.

2. The electronic apparatus according to claim 1, wherein the control unit control to start the drag processing of the object if a pressure load meeting a predetermined load standard is detected by the load detection unit and sliding originated from a position of the touch to the object is detected.

3. The electronic apparatus according to claim 2, wherein the control unit controls the load detection unit to resume detection if the sliding is no longer detected after the start of the drag processing of the object, and if a pressure load detected by the load detection unit at time of resuming fails to meet the predetermined load standard, sets the predetermined load standard to a load standard lower than the pressure load detected.

4. The electronic apparatus according to claim 3, wherein the control unit sets the load standard lower than the pressure load detected to a load standard lower than the pressure load detected by a difference between the pressure load detected by the load detection unit at the start of the drag processing and the predetermined load standard, as the predetermined load standard.

5. The electronic apparatus according to claim 1, wherein the control unit controls to end the drag processing based on detection by the touch sensor after the start of the drag processing.

6. An electronic apparatus comprising:
a display unit for displaying an object;
a touch sensor for detecting a touch to the display unit;
a load detection unit for detecting a pressure load on a touch face of the touch sensor;
a haptic presentation unit for presenting a haptic sense to a touch object touching the touch face; and
a control unit for controlling to start drag processing of the object based on detection of the touch to the object by the touch sensor and detection by the load detection unit,
wherein the control unit controls such that the load detection unit, regardless of the position of the touch on the touch face, stops detection from the start of the drag processing until a sliding speed of the touch object for the drag processing of the object no longer meets a predetermined speed standard as long as the touch to the object is detected, and that after the sliding speed of the touch object for the drag processing of the object fails to meet the predetermined speed standard, the haptic sense is presented to the touch object when the load detection unit detects a load standard failing to meet a load standard for presenting the haptic sense, and the drag processing is ended.

* * * * *